Patented May 10, 1932

1,857,478

UNITED STATES PATENT OFFICE

EDMUND CHARLES ROSSITER AND WILLIAM CHARLES DAVIS, OF LONDON, ENGLAND

MANUFACTURE OF ARTIFICIAL RESINS

No Drawing. Application filed December 2, 1929, Serial No. 411,200, and in Great Britain December 22, 1928.

This invention relates to improvements in the manufacture of artificial resins and products, for example, molding powders, therefrom.

It is known that phenols combine with certain classes of compounds to form resins many of which are of considerable commercial value. As an instance the condensation of phenols with aldehydes may be mentioned.

According to the present invention, the phenol-aldehyde condensation is effected in the presence of a relatively small quantity of dicyandiamide. It is found that the reaction is thereby promoted and takes place much more readily, besides leading in many cases to greatly improved products.

By way of example, it will be found that when phenol is condensed with formaldehyde in the presence of a small quantity of dicyandiamide, (i. e. not more than 10% calculated on the weight of the phenol) the dicyandiamide acts after the manner of a catalyst, to promote the condensation so that it takes place readily when the mixture is merely warmed. The reaction which evolves heat is easily controlled and a resin is produced which is eminently suitable for the manufacture of molding powders and other commercial uses.

The rate at which condensation takes place is readily controlled by adjusting the quantity of dicyandiamide which is added. For instance, if 2% of dicyandiamide on the weight of phenol is used, then the reaction mixture may be heated under reflux for 3–6 hours before the resin is completely precipitated; with 10% dicyandiamide the reaction proceeds so vigorously that after starting it by warming it proceeds without further heating and requires efficient cooling in order to prevent the condensation proceeding too far and resulting in the formation of insoluble and infusible compounds.

The following are two examples of specific processes according to the invention:—

*Example 1.*—40 parts by weight of phenol, 2 parts by weight of dicyandiamide are dissolved in commercial formalin containing 27 parts by weight of formaldehyde; the mixture is heated in a jacketed vessel at 70–80° C. with agitation; as soon as the heat evolved by the reaction commences to increase the temperature, cold water is passed into the jacket of the reaction vessel and the temperature is regulated at 70–85° C. for 4–5 hours. The mixture is then either evaporated to dryness or the heating continued until the whole of the resin is precipitated, the aqueous layer separated, and the resin dried in any well known manner.

The product is easily soluble in alcohol, etc., it is transparent, melts to a thin syrup at a low temperature, and when heated at 100°–120° C. is readily converted into a hard transparent resin which is very resistant to boiling water, and is insoluble in most solvents.

The resin is eminently suitable for use in the manufacture of molding powders.

*Example 2.*—2000 parts by weight of phenol and 50 parts dicyandiamide are dissolved in 1820 parts of formalin (containing 37% formaldehyde by weight) and heated and stirred at 90°–95° C. in a jacketed pot fitted with a condenser. Care is taken that the reaction does not become too vigorous and if necessary the charge is cooled. The condensation takes about 4–5 hours and is carried on until the mixture becomes milky owing to the separation of the resin. The mixture is then cooled quickly and any separation of water is syphoned off as completely as possible and the resin dried by passing air through it at 60°–70° C. or by careful heating at about that temperature with agitation to prevent local over-heating. The resin is then suitable for use. For instance, if required for the manufacture of molding powder it is mixed with hexamethylene tetramine and fillers, etc., in the well known manner.

As a further illustration, it will be found that the condensation of furfural with phenol is promoted and improved by the presence of dicyandiamide. As is known, furfural and phenol combine, when heated together at a considerable temperature, to yield a resin which is of commercial value. When, in accordance with the present invention, dicyandiamide is added the production of resin takes place very much more readily.

Thus a mixture of phenol and furfural containing dicyandiamide when heated for a few hours at about 120°–130° C. yields a very viscid resin which is soluble in alcohol and on further heating at 120°–140° C. yields a hard brittle resin.

When a mixture of phenol and furfural alone (i. e. containing no dicyandiamide) is treated in the same manner no apparent condensation takes place.

The reaction according to the present invention takes place quite easily when, for example, 1 mol. phenol, 1 mol. furfural, dicyandiamide in amount equal to about 10% of the weight of the phenol and a further quantity of furfural equal to 3 mols. furfural to 1 mol. dicyandiamide are heated 3–4 hours at 120°–130° C.

The resins obtainable are eminently suitable for the manufacture of molding powders, either alone or mixed with other resins and mixed with any of the fillers usually employed.

It is to be understood that the invention is capable of a wide application in the manufacture of phenol resins and that the proportions of starting materials and other conditions of procedure may be varied to a considerable extent, in order to obtain resins of various properties and characteristics.

What we claim is:—

1. The condensation of a phenol with an aldehyde in the presence of not more than 10% of dicyandiamide calculated on the weight of the phenol employed.

2. In the manufacture of artificial resins condensing a phenol with an aldehyde in the presence of water and of not more than 10% of dicyandiamide calculated on the weight of the phenol.

3. In the manufacture of artificial resins condensing a phenol with an aldehyde at a controlled elevated temperature not above 130° C. in the presence of water and of not more than 10% of dicyandiamide calculated on the weight of the phenol.

4. The manufacture of artificial resins suitable for molding purposes by reacting with phenol on commercial formalin in the presence of not more than 10% of dicyandiamide calculated on the weight of the phenol at an elevated temperature not above 85° C. for a few hours, preventing excessive condensation by controlling the temperature and removing water from the product.

In testimony that we claim the foregoing to be our invention, we have signed our names this 15 day of November, 1929.

EDMUND CHARLES ROSSITER.
WILLIAM CHARLES DAVIS.